(12) United States Patent
Mudra et al.

(10) Patent No.: US 10,352,202 B2
(45) Date of Patent: Jul. 16, 2019

(54) SWITCH VALVE AND CONNECTING ROD FOR VARIABLE COMPRESSION INTERNAL COMBUSTION ENGINE

(71) Applicant: ECO Holding 1 GmbH, Marktheidenfeld (DE)

(72) Inventors: Alexander Mudra, Goerlitz (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 111 days.

(21) Appl. No.: 15/702,929

(22) Filed: Sep. 13, 2017

(65) Prior Publication Data

US 2018/0094552 A1 Apr. 5, 2018

(30) Foreign Application Priority Data

Oct. 4, 2016 (DE) .................. 10 2016 118 757
Apr. 10, 2017 (DE) .................. 10 2017 107 702

(51) Int. Cl.
*F02B 75/04* (2006.01)
*F01L 1/24* (2006.01)
*B01D 29/52* (2006.01)
*F16C 7/06* (2006.01)
*F16C 23/10* (2006.01)

(52) U.S. Cl.
CPC ............... *F01L 1/24* (2013.01); *B01D 29/52* (2013.01); *F02B 75/044* (2013.01); *F02B 75/045* (2013.01); *F16C 7/06* (2013.01); *F16C 23/10* (2013.01); *F16C 2360/22* (2013.01)

(58) Field of Classification Search
CPC ......... F01L 1/24; F02B 75/044; F02B 75/045; B01D 29/52; F16C 7/06; F16C 23/10; F16C 2360/22
USPC ............................................. 123/48 B, 78 E
See application file for complete search history.

(56) References Cited

U.S. PATENT DOCUMENTS

| 4,552,480 A | 11/1985 | McIntyre |
| 2008/0230452 A1 | 9/2008 | Fujii et al. |
| 2013/0341544 A1 | 12/2013 | Murakami |
| 2015/0233288 A1* | 8/2015 | Paul ............ F02B 75/045 123/48 B |
| 2015/0233481 A1 | 8/2015 | Shimura |

(Continued)

FOREIGN PATENT DOCUMENTS

| DE | 19819619 A1 | 11/1999 |
| DE | 102015100662 A1 | 6/2016 |

(Continued)

*Primary Examiner* — Marguerite J McMahon
(74) *Attorney, Agent, or Firm* — Von Rohrscheidt Patents

(57) ABSTRACT

A switch valve for controlling a hydraulic fluid flow of a connecting rod for an internal combustion engine with variable compression with an eccentrical element adjustment arrangement for adjusting an effective connecting rod length, the switch valve including a valve housing including a first operating connection and a second operating connection and a supply connection, wherein at least one filter element is arranged in a portion of the first operating connection or the second operating connection or the supply connection. The switch valve is advantageously used in a connecting rod for an internal combustion engine with variable compression.

10 Claims, 8 Drawing Sheets

(56) References Cited

U.S. PATENT DOCUMENTS

| | | | | |
|---|---|---|---|---|
| 2015/0260094 A1* | 9/2015 | Wittek | .................. | F02B 75/045 |
| | | | | 123/48 B |
| 2016/0169099 A1* | 6/2016 | Schaffrath | ............. | F02B 75/045 |
| | | | | 123/197.3 |
| 2016/0177997 A1* | 6/2016 | Ezaki | ........................ | F16C 7/06 |
| | | | | 123/48 B |
| 2016/0258479 A1* | 9/2016 | Paul | ...................... | F02B 75/045 |

FOREIGN PATENT DOCUMENTS

| DE | 102015103205 A1 | 9/2016 |
|---|---|---|
| EP | 1382807 A2 | 1/2004 |
| JP | 2007321953 A | 12/2007 |

\* cited by examiner

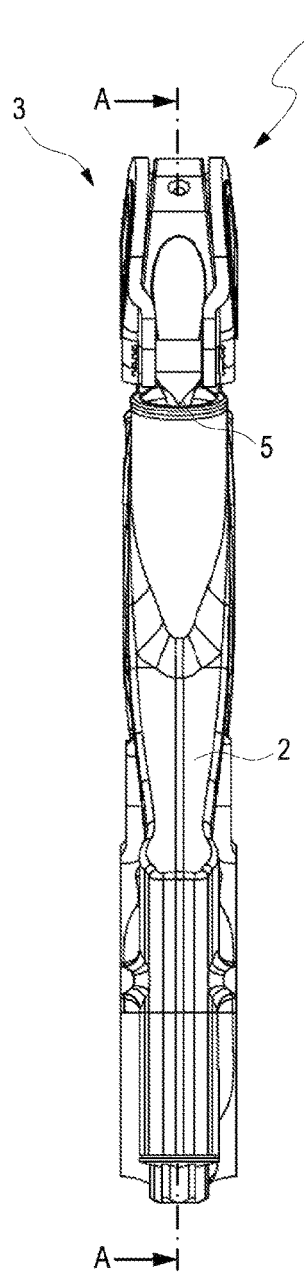
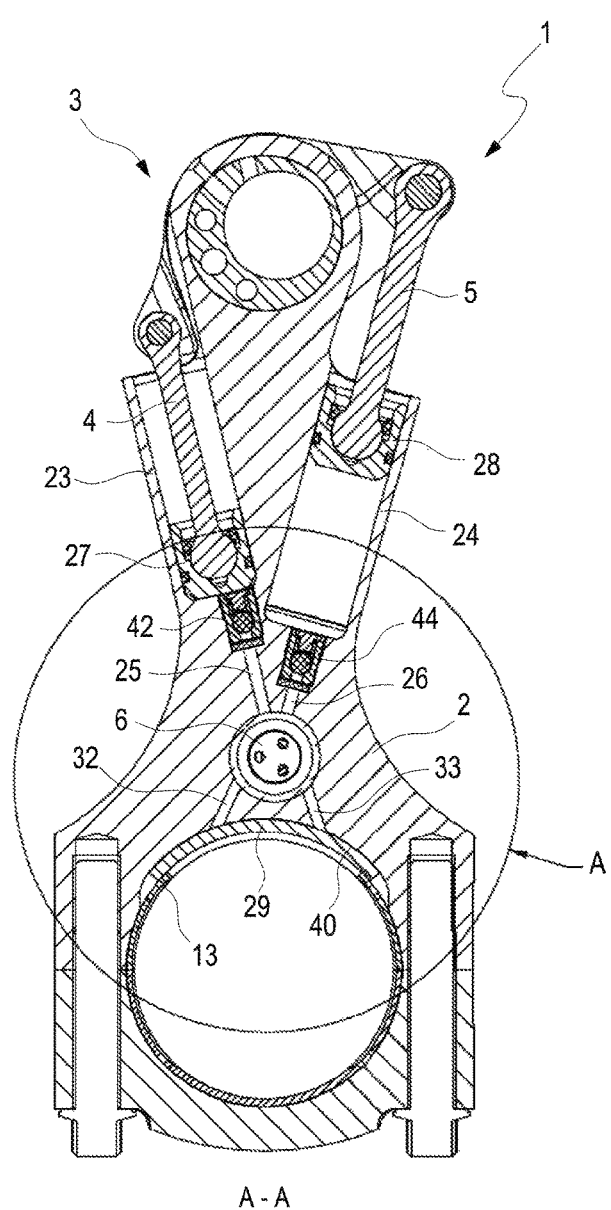
FIG. 7
FIG. 8

"A"

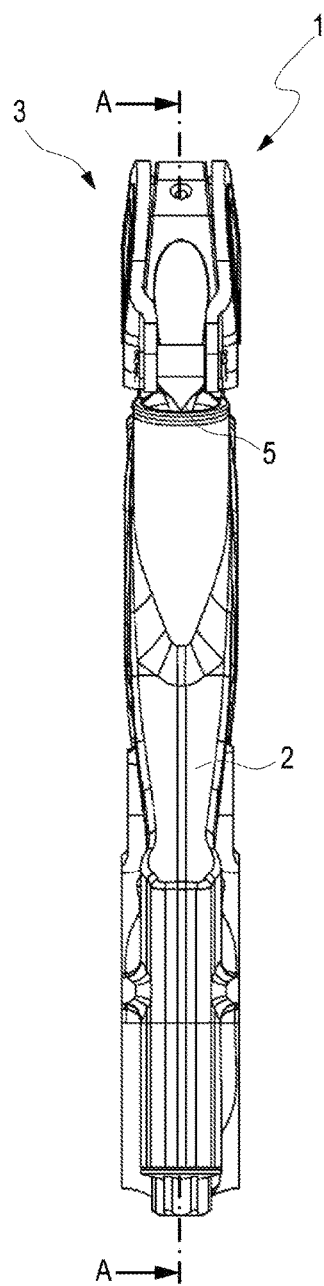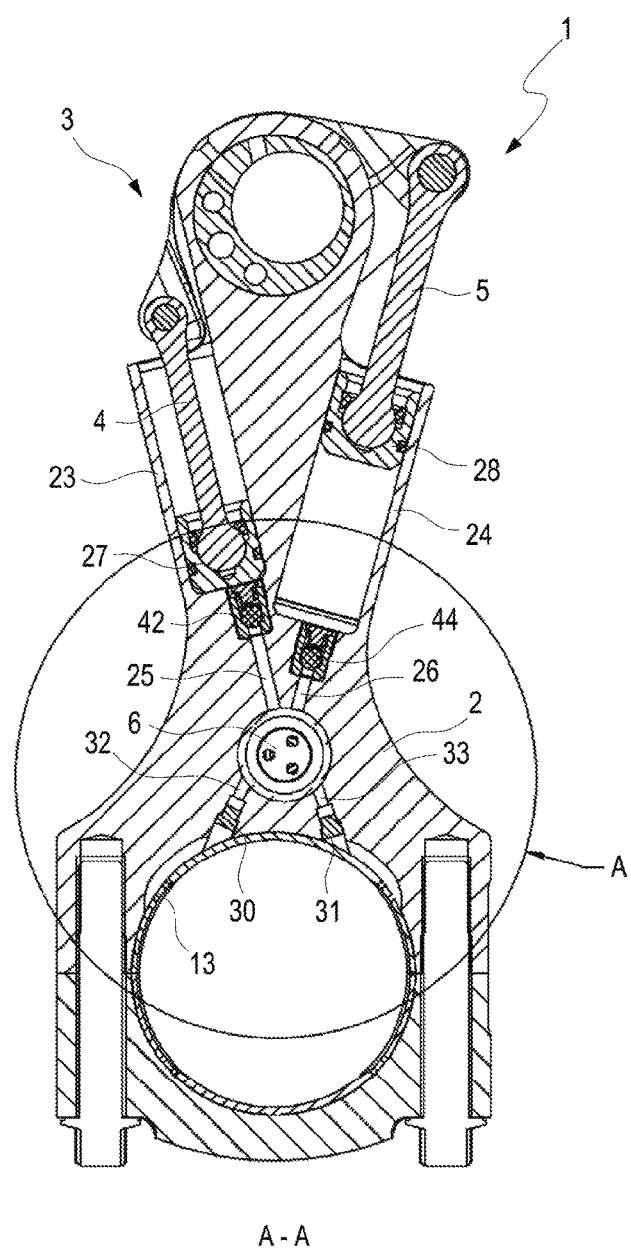
FIG. 10                    FIG. 11

"A"

SWITCH VALVE AND CONNECTING ROD FOR VARIABLE COMPRESSION INTERNAL COMBUSTION ENGINE

RELATED APPLICATIONS

This application claims priority from and incorporates by reference German Patent Applications DE 10 2016 118 757.7 filed on Oct. 4, 2016, and DE 10 2017 107 702,2 filed on Apr. 10, 2017.

FIELD OF THE INVENTION

The invention relates to a switch valve and a connecting rod for internal combustion engine with variable compression with an eccentrical element adjustment device for adjusting an effective connecting rod length.

BACKGROUND OF THE INVENTION

In internal combustion engines a high compression ratio has a positive effect upon efficiency of the internal combustion engine. Compression ratio is typically designated as a ratio of an entire cylinder volume before compression to a remaining cylinder volume after the compression. In internal combustion engines with external ignition, in particular gasoline engines which have a fixed compression ratio the compression ratio may only be selected high enough so that a so called "knocking" of the internal combustion engine is prevented under full load operations. However, for the much more prevalent partial load operations of the internal combustion engine, thus at a lower cylinder loading the compression ratio could be selected at higher values without the "knocking" occurring. The important partial load operation of the internal combustion engine can be improved when the compression ratio is variably adjustable. In order to adjust the compression ratio, for example systems with a variable connecting rod length are known.

Hydraulic fluid included in the internal combustion engine is contaminated with contaminant particles now and then in spite of known filtering measures. The filtering measures can impair functions of the hydraulic components of the connecting rod.

DE 10 2015 103 205A1 describes a connecting rod in which a filter element prevents a penetration of contaminants through the hydraulic oil into the hydraulic chambers starting at the crank shaft. Thus for example a filter element is integrated into a hydraulic conduit of the crank shaft. Furthermore a filter element is associated with a check valve, wherein a respective filter element is integrated into the hydraulic chambers of the connecting rod or into the hydraulic conduits of the connecting rod.

BRIEF SUMMARY OF THE INVENTION

Thus, it is an object of the invention to provide a switch valve for a connecting rod which provides robust operating properties with respect to introduced contaminants.

It is another object of the invention to provide a connecting rod which has robust operating properties with respect to introduced contaminants.

The objects are achieved according to an aspect of the invention by the features of the independent claims.

Advantageous embodiments and advantages of the invention can be derived from the dependent claims, the description and the drawing figure.

A switch valve for controlling a hydraulic fluid flow of a connecting rod for an internal combustion engine with variable compression with an eccentrical element adjustment device for adjusting an effective connecting rod length is proposed, including a valve housing which includes a first operating connection and a second operating connection and a supply connection. According to the invention at least one filter element is arranged in the portion of the connections of the switch valve.

In the hydraulic fluid of internal combustion engines, in particular in the engine oil particles and/or chips can be provided now and then from an abrasion of the mechanical components of the internal combustion engine like cylinder, crank drive and piston. Therefore the switch valve according to the invention includes at least one filter element in the portion of the connections of the switch valve wherein the filter element protects sensitive hydraulic components like check valves and/or mechanical or hydraulic switches from these particles and/or chips in order to provide a safe and long term function of the components.

This function can be implemented by filters or sieves which filter the oil coming from the bearing shell and which prevent particles from reaching the hydraulic components. Thus, the filter element can be arranged in the portion of at least one of the connections, for example of the first and second operating connection and in the portion of the supply connection of the switch valve. An alternative positon for the filter element can also be the outer circumference of the switch valve so that the filter element envelops the outer circumference of the switch valve.

This way the hydraulic flow can be advantageously filtered in a direction towards the switch valve which prevents particles and/or chips from entering the switch valve.

The filter element can also be integrated directly into the switch valve. Also here the hydraulic fluid is filtered in an effective manner so that the switch valve can be impaired in its function. This has the essential advantage that the connecting rod in which the switch valve is used does not have to be modified so that machining the connecting rod does not become more complex.

The filter element can be advantageously configured as a sieve. As a sieve for example a wire mesh encased by injection molding, a perforated sheet metal element encased by injection molding, a perforated sheet metal element or also a deep drawn sheet metal element can be used.

Filter elements according to the invention can advantageously include for example paper filters, metal fabric filters, sintered bronze, fleece material, synthetic material fabrics or similar materials.

The filter element can be inserted snap locked or pressed into the switch valve.

The filter element can be advantageously provided as a service life component, thus it does not have to be changed during its filtering operations.

According to an advantageous embodiment the first operating connection, the second operating connection and the supply connection can respectively include a filter element. This way potential contaminations in hydraulic fluid like particles or chips can be filtered in an effective manner from the hydraulic fluid. When both operating connections and the supply connection of the switch valve are provided with filter elements contaminations can be kept away from the sensitive components of the switch valve which are configured and fabricated with very tight tolerances and whose functional properties can be very sensitive against contaminant particles.

According to an advantageous embodiment the switch valve can be configured as a hydraulic valve or as a mechanical switch valve. In a hydraulic valve which is controlled by the hydraulic fluid as well as for a mechanical switch valve which is controlled mechanically it is advantageous when contaminant particles are filtered from the hydraulic fluid since the function of both embodiments can be impaired by particles due to the tight tolerances of the individual components.

According to an advantageous embodiment the filter elements can be arranged in recesses of the valve housing. Thus, the outer contour of the valve housing and thus of the switch valve can be maintained constant compared to an embodiment without filter elements. Thus, the switch valve with filter elements can be arranged without further modifications at the predetermined installation locations of the connecting rod. This way a connecting rod can be advantageously retrofitted with a switch valve with filter elements.

According to another advantageous embodiment the filter elements can be configured as sieves. Sieves are very effective in order to filter coarser contaminant particles from the hydraulic fluid. Sieves can be advantageously fabricated with a wide range of mesh widths and can be produced in a cost effective manner. Furthermore they have a high service life due to their material since they can be advantageously fabricated from metal or synthetic materials. Sieves are also very robust when used in rough environmental conditions.

According to an advantageous embodiment the filter elements can be configured as annular bands enveloping an outer circumference of the valve housing. Thus, operating connections or supply connections which can be configured e.g. as bore holes on the circumference of the valve housing can be respectively effectively covered with a respective filter element so that the hydraulic fluid flowing through the bore holes can be effectively filtered with respect to contaminant particles. The annular bands can be mounted on the valve housing in an effective manner. Thus the annular bands provide an effective protection of the switch valve against particles or chips in the hydraulic fluid.

According to an advantageous embodiment the filter elements can be integrated into the valve housing. When the filter elements are integral components of the valve housing reliable mounting of the filter elements is assured.

According to another aspect of the invention a connecting rod for an internal combustion engine with variable compression with an eccentrial element adjustment arrangement for adjusting an effective connecting rod length is proposed, wherein the eccentrical element adjustment arrangement includes two cylinders configured as support chambers. Furthermore a respective inlet is provided for feeding hydraulic fluid into the cylinders through a supply conduit as well as a respective drain for draining the hydraulic fluid from the cylinders. The connecting rod includes a switch according to the invention. Thus, the switch valve includes at least one filter element in the portion of the connections, in particular in the portion of the first and second operating connection and of the supply connection of the switch valve.

The filter element can be advantageously arranged directly in a portion of the connections of the switch valve. Alternative positions for the filter element can also be the outer circumference of the switch valve so that the filter element envelops the outer circumference of the switch valve.

This way the hydraulic flow in a direction towards the switch valve can be filtered advantageously which prevents particles and/or chips from reaching the switch valve.

The filter element can also be integrated directly into the switch valve. Also here the hydraulic fluid is filtered effectively and prevents that a function of the switch valve is impaired. Thus, it is an essential advantage that the connecting rod in which the switch valve is used does not have to be modified so that machining the connecting rod does not become more complex.

An annular sieve or filter element can also advantageously be arranged about the switch valve in a switch bore hole of the connecting rod in grooves or undercuts of the connecting rod. Thus it is an advantage that the hydraulic flow towards the switch valve can be filtered effectively.

The filter element can be advantageously configured as a sieve. Sieves can be provided for example from wire mesh encased by injection molding, a perforated sheet metal component encased by injection molding, a perforated sheet metal component or a deep drawn sheet metal component.

Filter elements according to the invention can advantageously be for example paper filters, metal fabric filters, sintered bronze, fleece material, synthetic material fabrics or similar material.

The filter element can be for example inserted snap locked or pressed into the switch valve.

According to an advantageous embodiment the filter elements can be arranged in recesses of a switch bore hole of the connecting rod. This way a typical switch valve can be used in the switch bore hole without changes at the switch valve or at the connecting rod which helps to implement a cost effective solution for filtering the hydraulic fluid.

According to an advantageous embodiment at least one check valve can be provided in the inlet wherein a filter element is arranged between the inlet and the connection of the check valve. This way the check valve can be protected effectively against malfunctions caused by particles or chips in the hydraulic fluid.

According to another aspect of the invention a connecting rod for an internal combustion engine with variable compression is proposed that includes a connecting rod body and an eccentrical element adjustment device for adjusting an effective connecting rod length wherein the eccentrical element adjustment device includes two cylinders configured as support chambers and wherein a respective inlet for feeding hydraulic fluid into the cylinders through at least one supply conduit that is connected with a bearing shell of the connecting rod is provided as well as a drain for draining hydraulic fluid from the cylinders. According to the invention at least one filter element is arranged between the connecting rod body and the bearing shell. The filter element can be advantageously integrated in a connecting rod. The filter element can be configured as a sieve as described supra. Due to the arrangement between the bearing shell and the connecting rod body the hydraulic fluid which is fed from the bearing shell can be filtered effectively so that contaminant particles or abrasion materials of the mechanical components do not impair the functions of the switch valve and/or of the check valves.

When the hydraulic fluid supply is arranged in the connecting rod cover the filter element can be advantageously arranged between the bearing shell and the connecting rod cover.

Thus it is an essential advantage that the hydraulic fluid fed from the bearing shell is filtered and the entire hydraulic system is thus protected against particles coming from an outside. This way the contact surface of the bearing shell does not have to be modified any further which advantageously prevents structural weakening of the contact surface which could increase the mechanical loading of the bearing shell.

According to an advantageous embodiment the filter element can be arranged in a groove at least on a portion of the circumference of the bearing shell. Thus, the load bearing capability of the bearing shell is impaired as little as possible so that the connecting rod and its crank bearing eye retain their original design load bearing capability.

According to an advantageous embodiment the filter element can be integrated into the connecting rod body. The filter element can be advantageously integrated also into the connecting rod. When only one supply connection of the connecting rod is provided the hydraulic fluid can be filtered effectively by a filter element.

According to another aspect of the invention a connecting rod for a variable compression internal combustion engine is proposed that includes a connecting rod body, a switch valve and an eccentrical element adjustment device for adjusting an effective connecting rod length wherein the eccentrical element adjustment arrangement includes two cylinders configured as support chambers and wherein a respective inlet is provided for feeding hydraulic fluid into the cylinders through a supply conduit that is connected with a bearing shell of the connecting rod as well as a respective drain for draining hydraulic fluid from the cylinders is provided. According to the invention filter elements are arranged in supply conduits which lead from the bearing shell in a direction towards the switch valve. In particular the filter elements can be integrated directly into the supply conduit. Thus, the hydraulic fluid can be filtered effectively before the hydraulic fluid reaches sensitive components like the switch valve and/or the check valves. A wear of the bearing shells through particles and chips is effectively prevented since the hydraulic fluid is overall filtered by the filter elements so that possible defects through contaminated hydraulic fluid at the connecting rod and/or the internal combustion engine can be effectively prevented.

According to an advantageous embodiment a connecting rod for an internal combustion engine with variable compression is proposed that includes a connecting rod body, a switch valve and an eccentrical element adjustment arrangement for adjusting an effective connecting rod length, wherein the eccentrical element adjustment arrangement includes a pivot motor which includes a rotor that is supported in a stator. Between at least one rotor blade of the rotor and at least one stator blade of the stator at least one first support chamber and at least one second support chamber are configured wherein a volume of the first support chamber and a volume of the second support chamber are adjustable in a complementary manner relative to each other by adjusting the rotor relative to the stator. According to the invention filter elements are arranged in supply conduits which lead from the switch valve in a direction towards the support chambers. Through the filter elements particles and/or chips can be filtered from the hydraulic fluid effectively so that possible damages to components of the pivot motor or at check valves in the connecting rod through abrasion or blocking can be substantially prevented. A safe function of the eccentrical element adjustment arrangement can thus be advantageously assured.

BRIEF DESCRIPTION OF THE DRAWINGS

Additional advantages can be derived from the subsequent drawing description. The drawings schematically illustrate an embodiment of the invention. The drawings, the description and the claims include numerous features in combination. A person skilled in the art will advantageously view the features individually and combine them into additional further combinations, wherein:

FIG. 7 illustrates a connecting rod according to another embodiment of the invention with a filter element between the connecting rod body and the bearing shell in a side view with the illustrated sectional plane A-A;

FIG. 8 illustrates the connecting rod in the longitudinal sectional view A-A in FIG. 7 with the illustrated blown up detail A;

FIG. 10 illustrates a connecting rod according to another embodiment of the invention with filter elements in supply conduits in a side view with the illustrated sectional plane A-A;

FIG. 11 illustrates the connecting rod in the longitudinal sectional view A-A in in FIG. 10 with the illustrated blown up detail A.

DETAILED DESCRIPTION OF THE INVENTION

Figure 1:
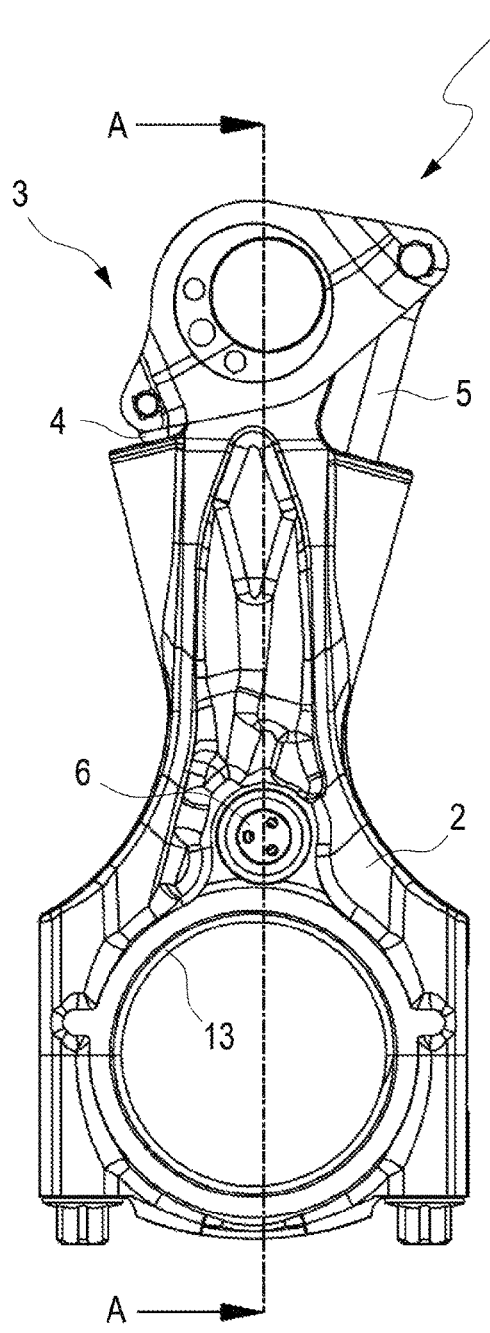
FIG. 1 illustrates a connecting rod according to the invention including a switch valve according to an embodiment of the invention in a top view with an illustrated sectional plane A-A.

In the drawing figures identical or like components are designated with identical reference numerals. The drawing figures only illustrate embodiments and do not limit the spirit and scope of the invention.

FIGS. 1-6 illustrate various views and sectional views or blown up illustrations of embodiments of a connecting rod 1 with a switch valve 6 in which according to the invention at least one filter element 14, 15, 16 is provided in the portion of operating and/or supply connections 10, 11, 12 of the switch valve 6.

Figure 2:
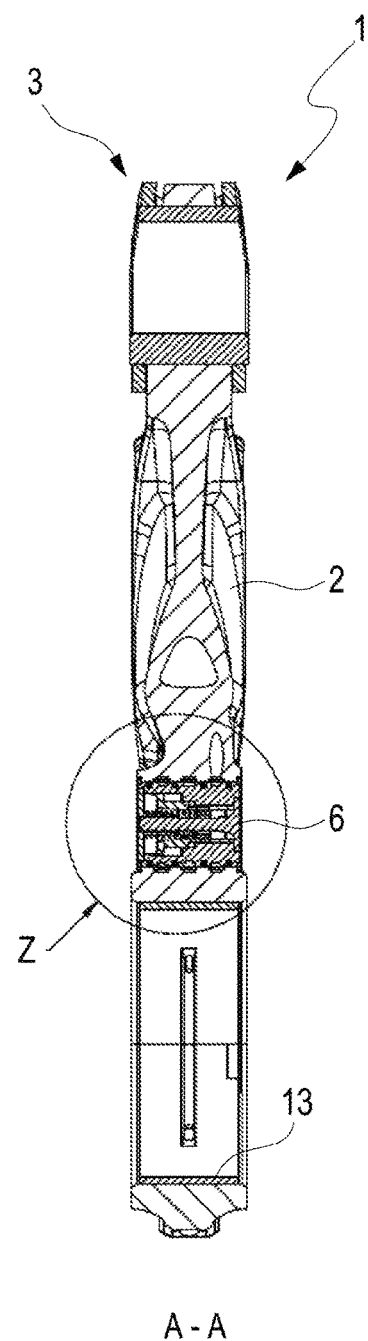
FIG. 2 illustrates the connecting rod in the longitudinal sectional view A-A in FIG. 1 with an illustrated blown up detail Z.

FIG. 1 illustrates a connecting rod 1 for an internal combustion engine with variable compression including an eccentrical element adjustment arrangement 3 for adjusting an effective connecting rod length with a switch valve 6 according to a first embodiment in top view with an illustrated sectional plane A-A. In FIG. 2 the connecting rod is illustrated in the longitudinal sectional view A-A of FIG. 1 with the illustrated blown up detail Z. FIG. illustrates the switch valve of FIG. 2 in the blown up detail Z.

The connecting rod 1 includes a connecting rod body 2 and an eccentrical element adjustment arrangement 3 including two cylinders 23, 24 that are visible in FIGS. 8 and 11 and configured as support chambers, a mass force side chamber (MKS) and a gas force side chamber (GKS) wherein a respective inlet 25, 26 for feeding hydraulic fluid into the cylinders 23, 24 through a supply conduit 32, 33 as well as a drain for draining hydraulic fluid from the cylinders 23, 24 are provided.

The eccentrical element adjustment arrangement 3 according to the illustrated advantageous embodiment can have two cylinders respectively including a piston 27, 28 that is movably supported in a cylinder bore hole and connected with a support rod 4, 5.

The switch valve 6 is provided for controlling the hydraulic fluid flow of the connecting rod 1 for adjusting the effective connecting rod length through the eccentrical element adjustment arrangement 3. The switch valve 6 includes a valve housing 8 which includes a first operating connection 10 and a second operating connection 11 and a supply connection 12.

A piston 9 that is movable in the valve housing 8 is optionally displaceable into a first switching position or a second switching position wherein the first operating connection 10 is connected with the supply connection 12 and with a supply conduit that is connected with a bearing shell 13 of the connecting rod and in the second switching position the second operating connection 11 is connected with the supply connection 12 and a supply conduit that is connected with the bearing shell 13 of the connecting rod.

According to the invention it is provided that a respective filter element 14, 15, 16 is arranged in the connecting rods 1 according to the invention of the embodiments illustrated in FIGS. 1-6 in a portion of the connections 10, 11, 12 of the switch valve 6. The two filter elements 14 and 15 are thus respectively associated with the first or the second operating connection 10, 11 and the filter element 16 is associated with the supply connection 12. As evident from FIG. 3 the filter elements 14, 15, 16 are configured as annular bands that envelop an outer circumference of the valve housing 8.

Figure 3:
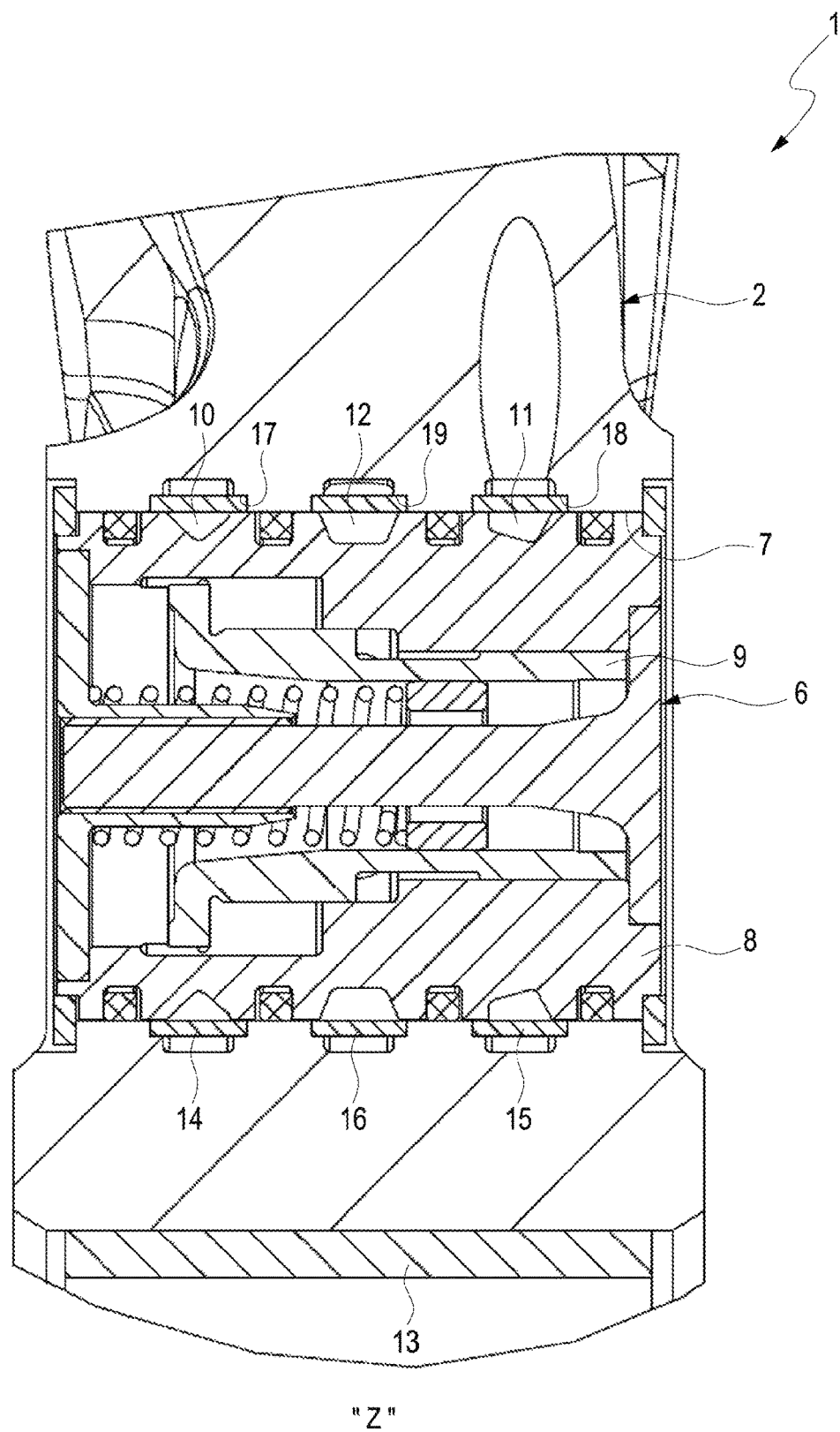
FIG. 3 illustrates the switch valve of FIG. 2 in the blown up detail Z.

According to the embodiment illustrated in FIGS. 1-3 the filter elements 14, 15, 16 are arranged in recesses 17, 18, 19 of the switch bore hole 7 of the connecting rod 1 or of the connecting rod body 2. The entire flow of hydraulic fluid in a direction of the switch valve 6 is thus advantageously filtered. The switch valve 6 can be used with its outer dimensions unchanged.

The filter elements 14, 15, 16 can be advantageously configured as sieves in order to stop contaminant particles in the hydraulic fluid.

Figures 4, 5:
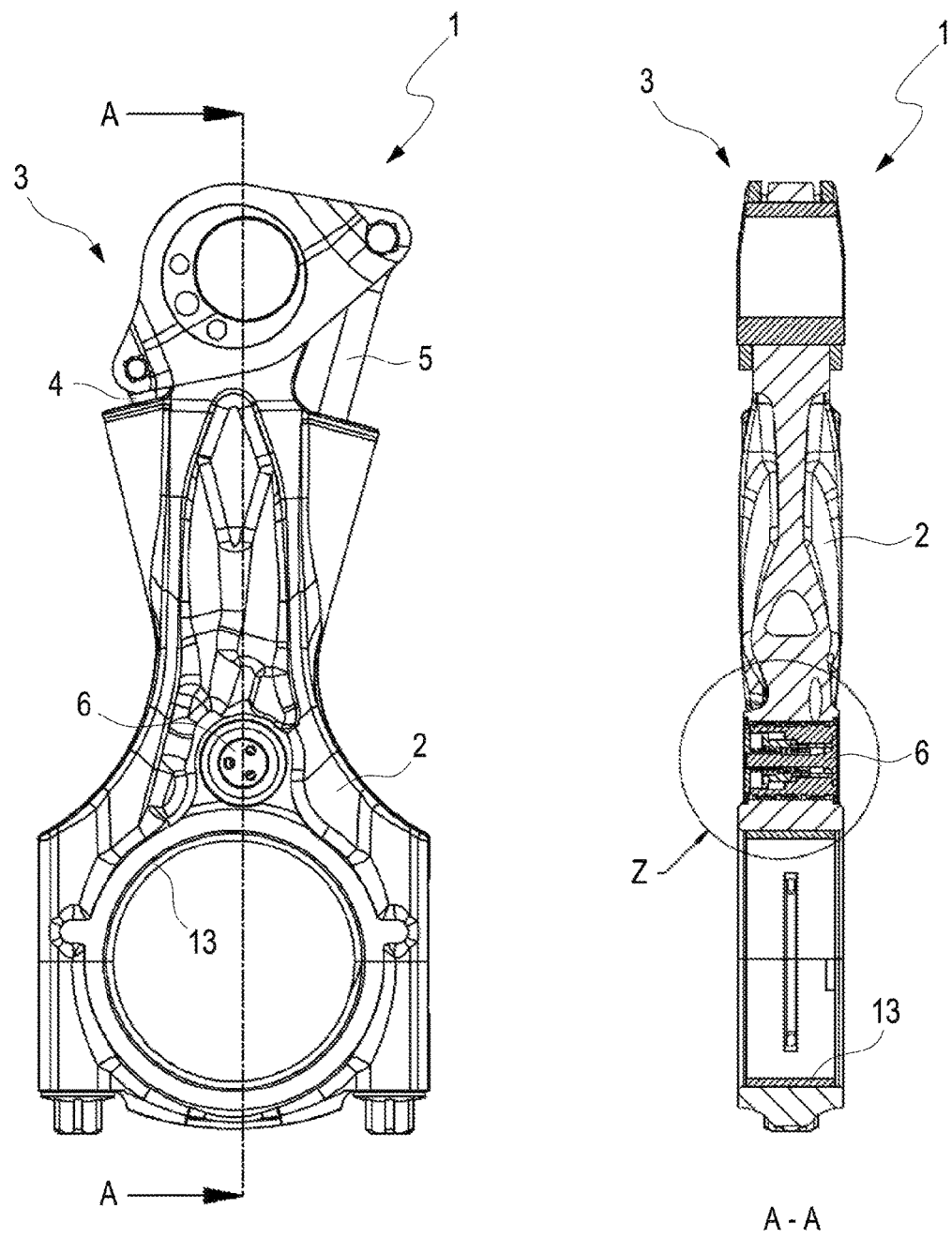
FIG. 4 illustrates a connecting rod according to the invention with a switch valve according to another embodiment of the invention in top view with an illustrated sectional plane A-A.
FIG. 5 illustrates the connecting rod in the longitudinal sectional view A-A of FIG. 4 with the illustrated blown up detail Z.
Figure 6:
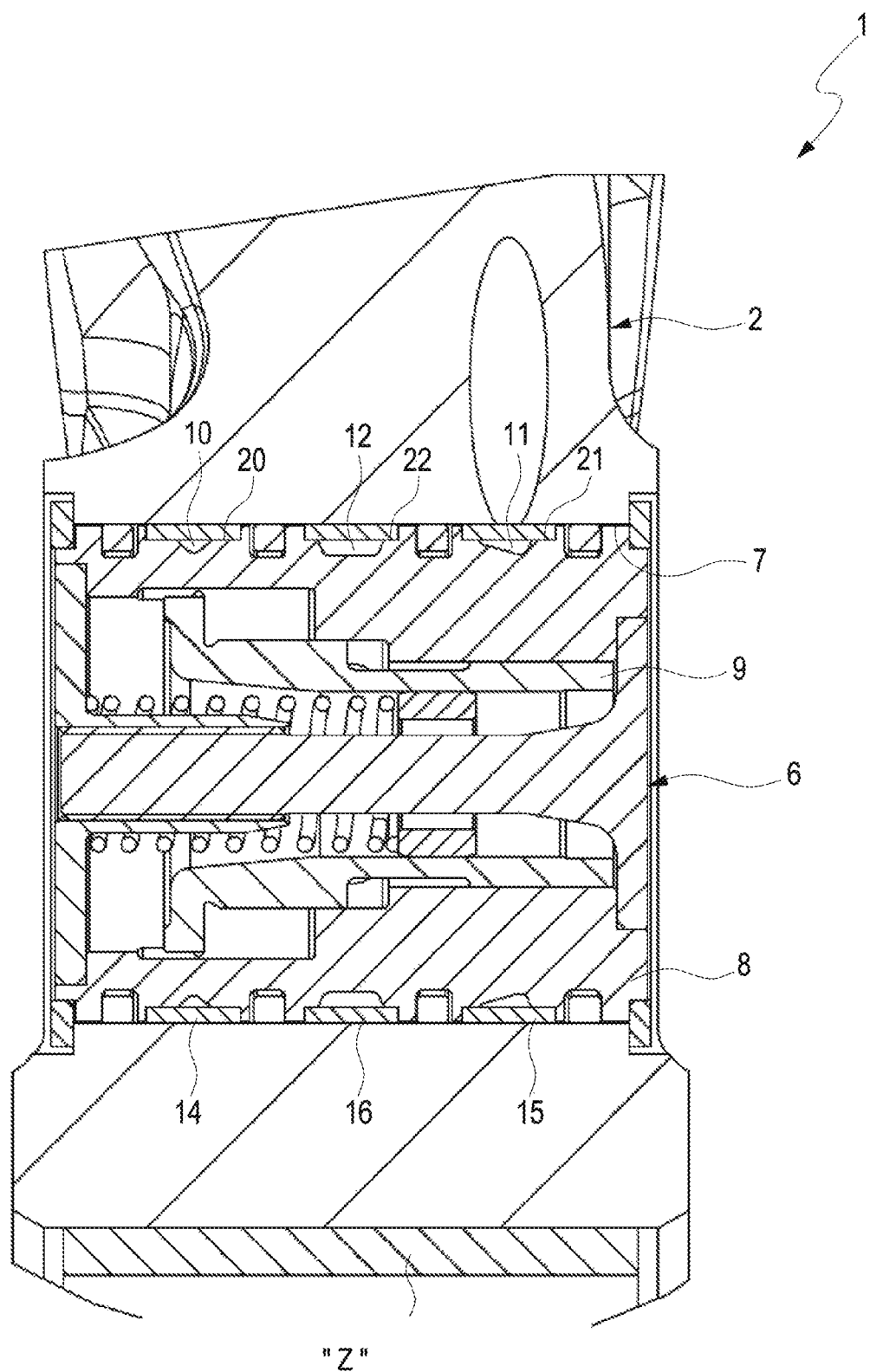
FIG. 6 illustrates the switch valve of FIG. 5 in the blown up detail Z.

FIG. 4 illustrates a connecting rod 1 with a switch valve 6 according to another embodiment of the invention in a top view with an illustrated sectional plane A-A, whereas FIG. 5 illustrates the connecting rod 1 in the longitudinal sectional view A-A of FIG. 4 with the illustrated blown up detail Z and FIG. 6 illustrates the switch valve 6 of FIG. 5 in the blown up detail Z.

In this additional embodiment the filter elements 14, 15, 16 are arranged in recesses 20, 21, 22 of the valve housing 8. The filter elements 14, 15, 16 can be advantageously integrated completely into the valve housing 8. Also in this embodiment the entire flow of hydraulic fluid in a direction towards the switch valve 6 is advantageously filtered through the arrangement of the filter elements 14-16 in the valve housing 8, however complex machining of the connecting rod body 2 can be omitted. The switch bore hole 7 in the connecting rod body 2 for receiving the switch valve 6, however, can be used unchanged.

The switch valve 6 illustrated in FIGS. 3 and 6 is arranged as a hydraulic valve in a switch bore hole 7 of the connecting rod body, for example pressed in.

The switch valve 6 can be configured according to the invention as illustrated as a hydraulic valve. According to the invention, however, it is also conceivable that the switch valve 6 is provided as a mechanical valve.

Figure 9:
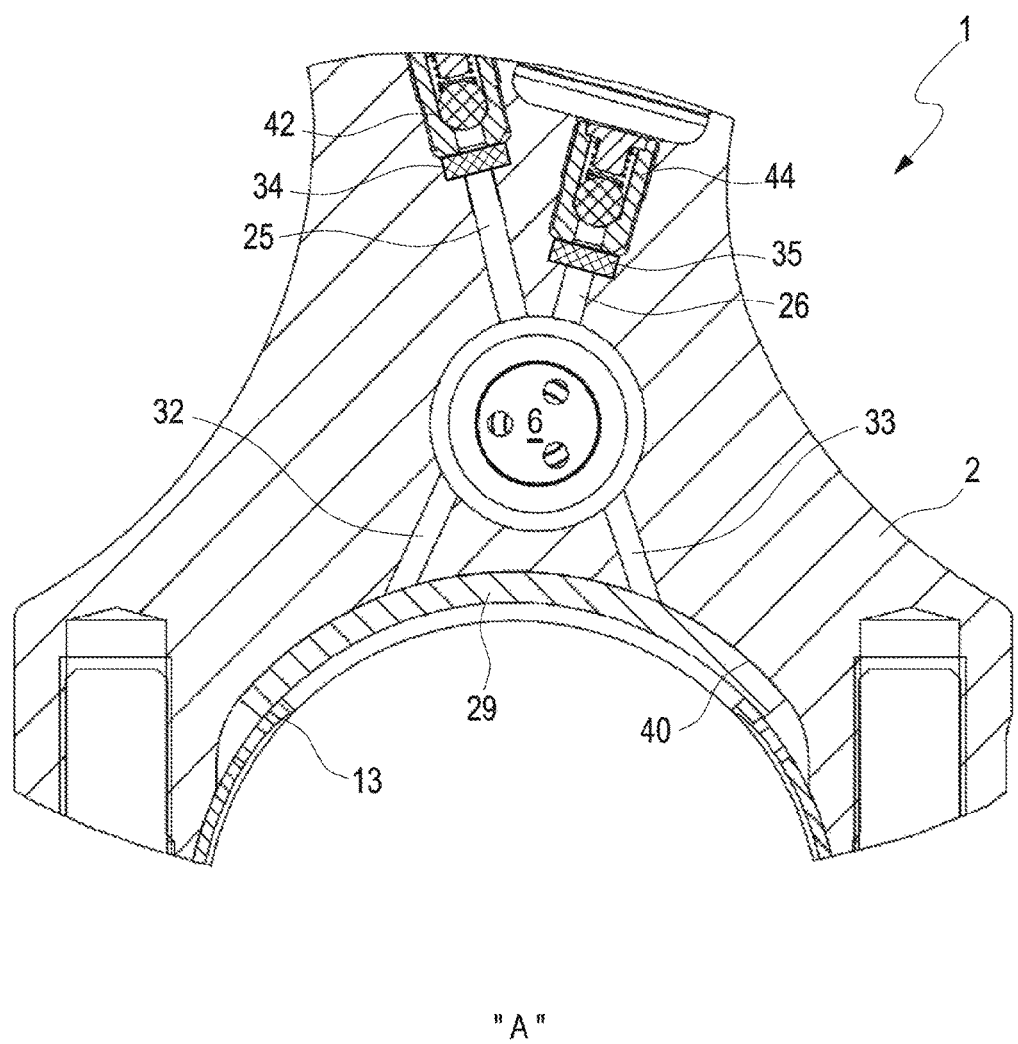
FIG. 9 illustrates the connecting rod of FIG. 7 with the blown up detail A.

FIGS. 7-9 illustrate another embodiment of the invention. FIG. 7 illustrates a connecting rod 1 with a switch valve 6 with a filter element 29 between the connecting rod body 2 and the bearing shell 13 in a side view with an illustrated sectional plane A-A, whereas FIG. 8 illustrates the connecting rod 1 in the longitudinal sectional view A-A of FIG. 7 with the illustrated blown up detail A. FIG. 9 illustrates a portion of the connecting rod 1 in the blown up detail A.

According to the embodiment in FIGS. 7-9 it is provided according to the invention that a filter element 29 is arranged between the connecting rod body 2 and the bearing shell 13. The filter element 29 is thus arranged in a groove 40 at least on a portion of the circumference of the bearing shell 13. Advantageously all the hydraulic fluid which is sucked out of the bearing shell 13 is filtered in this embodiment. By arranging the filter element 29 in a groove 40 only on a portion of the circumference of the bearing shell 13 it is provided that the contact surface towards the bearing shell 13 is weakened as little as possible structurally so that the load bearing capability of the bearing shell 13 is essentially maintained. Advantageously the filter element 29 can be integrated into the connecting rod body 2 completely.

It is furthermore illustrated in FIG. 8 how check valves 42, 44 are provided in the inlet 25, 26 according to another embodiment of the connecting rod 1 wherein a respective filter element 34, 35 is arranged between the inlet 25, 26 and the connections of the check valves 42, 44. Thus, advantageously the hydraulic fluid flow that flows into the check valves 42, 44 can be filtered additionally with respect to contaminant particles with good effect. Finer sieves can be used for example for the filter elements 34, 35 so that also smaller particles or chips can be filtered out of the hydraulic fluid. The two filter elements 34, 35 upstream of the check valves 42, 44, however, represent additional options to filter the hydraulic fluid and do not have to be used in combination with the filter element 29 between the bearing shell 13 and the connecting rod body 2, but can be used for example also together with the filter elements 14, 15, 16 arranged directly at the switch valve 6.

Figure 12:
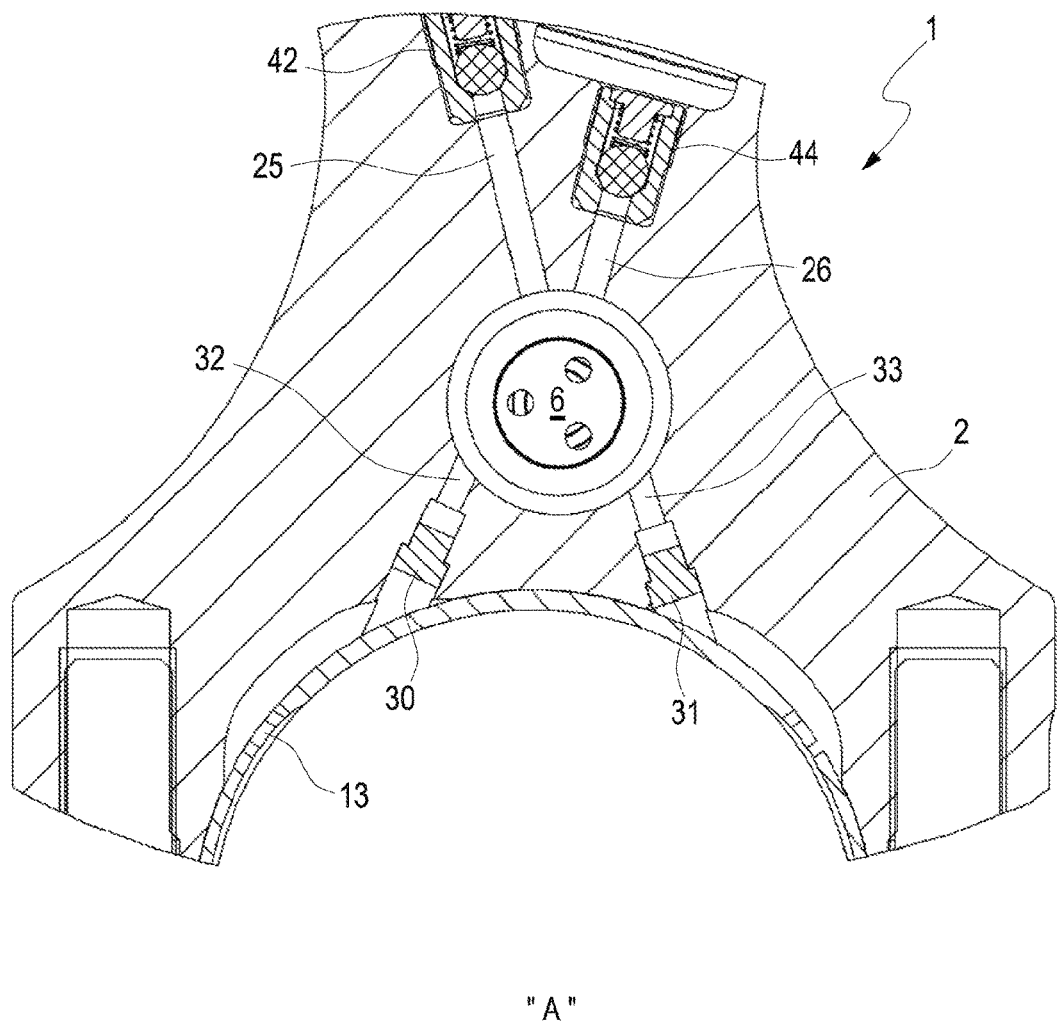
FIG. 12 illustrates the connecting rod of FIG. 10 with the blown up detail A.

FIGS. 10-12 illustrate another embodiment of the invention. FIG. 10 illustrates a connecting rod 1 with a switch valve 6 with filter elements 30, 31 in supply conduits 32, 33 in a side view with an illustrated sectional plane A-A, whereas FIG. 11 illustrates the connecting rod 1 in the longitudinal sectional view A-A of FIG. 10 with the illustrated blown up detail A. FIG. 12 illustrates the connecting rod 1 in the blown up detail A.

In the embodiment in FIGS. 10-12 the filter elements 30, 31 are arranged in supply conduits 32, 33 which run from the bearing shell 13 in a direction towards the switch valve 6. Advantageously only a single supply conduit 32, 33 is provided with a filter element 30, 31 from the bearing shell in a direction towards the switch valve 6. The filter element 31 can be advantageously integrated completely into the supply conduit 32, 33. Advantageously in this embodiment all hydraulic fluid which is suctioned from the bearing shell 13 is filtered.

Alternatively a non-illustrated connecting rod with an eccentrical element adjustment arrangement can include a pivot motor which includes a rotor that is supported in a stator, wherein at least one first support chamber and at least one second support chamber is arranged between at least one rotor blade of the rotor and at least one stator blade of the stator, wherein a volume of the first support chamber and a volume of the second support chamber are variable relative to each other in a complementary manner by adjusting the rotor relative to the stator. According to the invention also in this embodiment filter elements can be arranged in the supply conduits which lead from the switch valve in a direction towards the support chambers of the pivot motor. Advantageously in this embodiment all hydraulic fluid which flows through a switch valve in a direction towards the support chambers is effectively filtered with respect to contaminant particles in the hydraulic fluid.

The filter elements 14, 15, 16, 29, 30, 31, 34, 35 which are used in the embodiments illustrated in FIGS. 1-12 can be advantageously configured as a sieve. For the sieves for example a wire mesh web that is encased by injection molding, a perforated sheet metal element that is encased by injection molding and a perforated sheet metal element or also a deep drawn sheet metal element can be used.

The filter elements 14, 15, 16, 29, 30, 31, 34, 35 according to the invention can also advantageously include for example paper filters, metal mesh filters, sintered bronze, fleece material, synthetic material fabrics or similar materials.

The filter elements 14, 15, 16, 29, 30, 34, 35 can be inserted, snap locked or pressed in their respective receiver in the switch valve 6 or in the connecting rod body 2.

The filter elements 14, 15, 16, 29, 30, 31, 34, 35 can be advantageously provided as service life components, thus they do not have to be replaced during the filtering service.

The filter elements 14, 15, 16, 29, 30, 31, 34, 35 of the various embodiments, however, have in common that they can be used respectively by themselves or in combination with other filter elements at or in the connecting rod 1 in order to effectively filter the hydraulic fluid with respect to particles or chips and thus to save sensitive mechanical components like switch valves and/or check valves from damage or failure.

What it claimed is:

1. A switch valve for controlling a hydraulic fluid flow of a connecting rod for an internal combustion engine with variable compression with an eccentrical element adjustment arrangement for adjusting an effective connecting rod length, the switch valve comprising:
    a valve housing including a first operating connection and a second operating connection and a supply connection,
    wherein at least one filter element is arranged in a portion of the first operating connection or the second operating connection or the supply connection.

2. The switch valve according to claim 1, wherein the first operating connection, the second operating connection and the supply connection respectively include the at least one filter element.

3. The switch valve according to claim 1, wherein the switch valve is configured as a hydraulic valve or as a mechanical switch valve.

4. The switch valve according to claim 1, wherein the at least one filter element is arranged in recesses of the valve housing.

5. The switch valve according to claim 1, wherein the at least one filter element is configured as a sieve.

6. The switch valve according to claim 1, wherein the at least one filter element is configured as an annular band that envelops an outer circumference of the valve housing.

7. The switch valve according to claim 1, wherein the at least one filter element is integrated into the valve housing.

8. A connecting rod for an internal combustion engine with variable compression, the connecting rod comprising:
    a switch valve according to claim 1; and
    an eccentrical element adjustment arrangement for adjusting an effective connecting rod length,
    wherein the eccentrical element adjustment arrangement includes a first cylinder and a second cylinder configured as support chambers,
    wherein a first inlet for feeding hydraulic fluid into the first cylinder through a first supply conduit and a first drain for draining hydraulic fluid from the first cylinder is provided, and
    wherein a second inlet for feeding hydraulic fluid into the second cylinder through a second supply conduit and a second drain for draining hydraulic fluid from the second cylinder is provided.

9. The connecting rod according to claim 8, wherein filter elements are arranged in recesses of a switch bore hole of the connecting rod.

10. The connecting rod according to claim 8,
    wherein the first inlet and the second inlet include a least one check valve, and
    wherein a filter element is arranged between the first inlet and the second inlet and a connection of the at least one check valve.

* * * * *